United States Patent [19]
Torigoe et al.

[11] Patent Number: 5,398,387
[45] Date of Patent: Mar. 21, 1995

[54] INTERENGAGING FASTENER MEMBER AND FASTENER HAVING SAME

[75] Inventors: Shinji Torigoe, Sagamihara; Haruyuki Sugasawa, Fujisawa, both of Japan

[73] Assignee: Minnesota Mining and Manufacturing Company, St. Paul, Minn.

[21] Appl. No.: 136,784

[22] Filed: Oct. 14, 1993

[30] Foreign Application Priority Data

Oct. 16, 1992 [JP] Japan .................................. 4-278750

[51] Int. Cl.$^6$ ........................................... A44B 18/00
[52] U.S. Cl. ..................................................... 24/452
[58] Field of Search ................. 24/442, 447, 448, 450, 24/452, 575, 576, 577

[56] References Cited

U.S. PATENT DOCUMENTS

| | | |
|---|---|---|
| 3,147,528 | 9/1964 | Erb . |
| 3,266,113 | 8/1966 | Flanagan . |
| 3,505,772 | 4/1970 | DeClaire et al. . |
| 4,056,593 | 11/1977 | de Navas Albareda . |
| 4,169,303 | 10/1979 | Lemelson . |
| 4,216,257 | 8/1980 | Schams et al. . |
| 4,290,174 | 9/1981 | Kalleberg . |
| 4,290,832 | 9/1981 | Kalleberg . |
| 4,322,875 | 4/1982 | Brown et al. . |
| 4,454,183 | 6/1984 | Wollman . |
| 4,531,733 | 7/1985 | Hall ..................... 24/449 X |
| 4,563,380 | 1/1986 | Black et al. . |
| 4,699,622 | 10/1987 | Toussant et al. . |
| 4,706,914 | 11/1987 | Ground . |
| 4,710,414 | 12/1987 | Northrup et al. . |
| 4,784,890 | 11/1988 | Black . |
| 4,792,240 | 12/1988 | Ausnit . |
| 4,819,309 | 4/1989 | Behymer . |
| 4,894,060 | 1/1990 | Nestegard . |
| 4,910,062 | 3/1990 | Zinke et al. . |
| 5,040,275 | 8/1991 | Eckhardt et al. . |
| 5,077,870 | 1/1992 | Melbye et al. . |
| 5,100,400 | 3/1992 | Mody et al. . |
| 5,138,750 | 8/1992 | Gundlach et al. . |
| 5,140,727 | 8/1992 | Dab et al. ..................... 24/577 X |
| 5,149,573 | 9/1992 | Kobe et al. . |
| 5,201,101 | 4/1993 | Rouser et al. . |
| 5,242,646 | 9/1993 | Torigoe et al. . |

FOREIGN PATENT DOCUMENTS

| | | |
|---|---|---|
| 0276970 | 8/1988 | European Pat. Off. . |
| 0323014 | 7/1989 | European Pat. Off. . |
| 53-22889 | 7/1978 | Japan . |
| 61-215766 | 9/1986 | Japan . |
| 61-255607 | 11/1986 | Japan . |
| 339155 | 8/1959 | Switzerland . |
| WO89/08201 | 9/1989 | WIPO . |

*Primary Examiner*—James R. Brittain
*Attorney, Agent, or Firm*—Gary L. Griswold; Walter N. Kirn; Leland D. Schultz

[57] ABSTRACT

A fastener member 10 has a generally planar base section 12 and a plurality of engaging strips 14 projecting from one surface of the base section 12 and extending parallel to each other in the longitudinal direction. Each of the engaging strips 14 has a vertical portion 16 adjoining the base section 12, and a head portion 18 formed at the end of the vertical portion 16. The head portion 18 of the engaging strip 14 is provided with a plurality of slots 20 extending transversely through the head portions 18. The slots 20 may be inclined with respect to the base section 12. The slots 20 guide headed stems of the opposed fastener member, and reduce the pressure necessary for interengagement. Even when the compressive force is applied in the direction inclined to the base section 12 of the fastener member 10, the interengagement can be easily obtained without bending the headed stems of the opposed fastener member by the guiding effect of the slots 20.

7 Claims, 5 Drawing Sheets

INTERENGAGING FASTENER MEMBER AND FASTENER HAVING SAME

TECHNICAL FIELD

The present invention relates to an interengaging fastener member, and to a fastener including the fastener member.

BACKGROUND OF THE INVENTION

Fasteners including a pair of cooperative fastener members that may be interengaged to attach one object to another object are known. For example, hook and loop fasteners generally comprise a first fabric fastener member having a plurality of hooks extending from a generally planar base section, and a second fabric fastener member having a plurality of loops extending from a generally planar base section. The hooks and loops of the respective members may be interengaged to attach the fastener members to each other. For purposes of this invention, each of two fastening components will be designated a "fastener member," and two cooperative fastener members will together be designated a "fastener."

Another conventional type of interengaging fastener, shown in FIG. 7(a), includes first fastener member 1 and second fastener member 2. Each fastener member has a generally planar base section 3 and 4, respectively, and an arranged plurality of headed stems 5 projecting from the respective base sections. The opposed first and second fastener members 1, 2, which are typically made of a molded polymeric material, are interengaged by bringing the heads of the stems 5 into contact with each other such that the base sections 3, 4 of the fastener members are parallel. When a predetermined compressive force F is applied to the fastener members 1, 2, the heads of the stems 5 bypass each other to fasten the fastener members 1, 2 together due to interference between adjacent heads. Such a fastener has utility in a variety of applications, and is referred to herein as a "headed stem fastener." Examples of such a fastener are shown in U.S. Pat. Nos. 4,216,257, 4,290,174, and 5,077,870, and are available from Sumitomo 3M Limited of Tokyo, Japan under the designation "Dual Lock" brand fasteners.

Headed stem fasteners may be used in conjunction with a fixed pane window in, for example, the manufacturing process of an automobile. A fixed pane window typically is affixed to a window frame of the automobile body with an adhesive around the periphery of the window. However, during the time that the adhesive is hardening, it is necessary to hold the window securely, so that the window is not moved and the adhesion is not damaged. When a headed stem fastener is used to secure the window to the window frame, the first and second fastener members are affixed to the window and to the window frame, respectively, and are brought into opposite contact with each other. The fastener members may be interconnected with each other by a predetermined compressive force, after the window has been arranged at the correct position. After the window is positioned in the window frame in this way, the adhesive will harden, and a window molding may be mounted about the periphery of the window for protection and decoration. The molding is generally made of an extruded resin material.

In the foregoing application, difficulty may arise in interengaging the fastener members if the direction of the compressive force F is inclined with respect to the orientation of headed stems of a fastener member. For example, the first fastener member 1 may be adhered to inclined surface 6, and the second fastener member 2 may be positioned for interengagement with the fastener member 1, as shown in FIG. 7(b). Force F' is applied to the second fastener member 2 at force angle α with respect to the headed stems 5 of the second fastener member 2. Because force F' is inclined with respect to the headed stems 5, the headed stems 5 of the two fastener members 1, 2 may bend sideways when force F' is applied, as shown in FIG. 7(c). If the headed stems 5' bend sufficiently, the heads will not bypass each other, and the fastener members 1, 2 will not engage. Thus, the window may not be properly affixed to the automobile, which can result in leaking or window replacement costs.

A fastener member having headed projection strips may be used for solving the above problem. The faster member may be constructed, for example, as an intermediate step in the manufacturing process for the headed stem fastener, as disclosed in Japanese Examined Patent Publication (Kokoku) No. 53-22889. Each fastener member has a plurality of engaging strips projecting from and extending mutually parallel and longitudinally of a generally flat base section. Each of the engaging strips has a vertical portion adjoining the base section, a head portion adjoining the vertical portion, and two end faces. When a pair of fastener members is used, the engaging strips of each fastener member are opposed to and parallel with each other, and the head portions thereof may be engaged with each other by a predetermined compressive force. Thus, if the compressive force is applied in an inclined direction with respect to the longitudinal direction of the engaging strips, the engaging strips may be engaged with each other due to rigidity thereof, without being bent.

However, in a fastener comprising a pair of the above fastener members with engaging strips, it is necessary that the longitudinal direction of the engaging strips coincide with each other when the fastener members are interengaged. Thus, it becomes difficult to move the fastener members relative to each other for positioning, which negates some of the advantages described above for using the fastener members as the fastening assist member for a vehicle window. This problem may be solved by replacing one of the fastener members by a headed stem fastener member, but difficulty with bending the headed stems may arise again.

Another difficulty with conventional interengaging fasteners, such as hook and loop fasteners or headed stem fasteners, is that the fasteners typically cannot be engaged by parallel sliding of the fastener members. Hook and loop fasteners tend to engage upon contact, and it is therefore difficult to contact the fastener members and then slide one relative to the other. Headed stem fastener members cannot be engaged with each other by parallel sliding because the individual headed stems would be bent. In the fastener members mentioned above having engaging strips, end faces of the engaging strips extend vertically from the base section, and thus tend to collide with each other upon sliding engagement. Therefore, it is difficult to interconnect the fastener members by sliding engagement.

Further, when both the interengaging fastener for fastening a window and the molding fastener for fastening a window molding are arranged on the window frame of the vehicle body, the operation for attaching these independent fastener members to the window frame has heretofore been performed by different processes, and thus the number of steps and the labor of operators in a production line has been increased. Also, it is necessary for operators to be skilled because of the requirement for rapid and accurate positioning and correct attachment in a relatively restricted space.

It is therefore desirable to provide an interengaging fastener member that can be easily engaged with an opposed fastener member by applying a compressive force in a direction that is inclined with respect to a base section of the fastener member. It is also desirable to provide an interengaging fastener member that allows a pair of fastener members to be slidingly engaged with each other. Further, it is desirable to provide an interengaging fastener member that facilitates a reduction in the time required for affixing a vehicle window to a frame.

SUMMARY OF THE INVENTION

The present invention provides an interengaging fastener member comprising a base section and a plurality of parallel engaging strips projecting from and extending longitudinally of the base section. The engaging strips each have a vertical portion adjoining the base section, a head portion adjoining the vertical portion, and two end faces. The engaging strips are adapted for engagement with a projecting head portion of an opposed fastener member, and the head portion of at least one of the engaging strips has a plurality of transverse slots formed therein. The slots formed through the head portion of the engaging strips guide the projecting head portion of the opposed fastener member and facilitate the interengagement of the head portions. Therefore, when interengaging the fastener members, the fastener members can be easily joined to each other by applying a relatively small force. In the case when the opposed fastener member has a plurality of headed stems, the fastener member of the present invention acts in the same manner.

The present invention further provides an interengaging fastener member comprising a base section and a plurality of parallel engaging strips projecting from and extending longitudinally of the base section. The engaging strips each have a vertical portion adjoining the base section, a head portion adjoining the vertical portion, and two end faces. The engaging strips are adapted for engagement with a projecting head portion of an opposed fastener member, and the end faces are inclined with respect to the base section to facilitate sliding engagement of the fastener member with an opposed fastener member. The inclined end faces of the engaging strips, soften a collision between the engaging strips and the projecting head portion of the opposed fastener member and facilitate engagement of the projecting head portion with the engaging strips, thus facilitating sliding engagement of the fastener members. In the case when one fastener member has a plurality of headed stems and the other fastener member has a plurality of engaging strips, the inclined end faces of the latter acts in the same manner.

The present invention further provides a fastener comprising first and second fastener members adapted for cooperative interengagement, the fastener members each including a base section and a plurality of parallel engaging strips projecting from and extending longitudinally of the base section. The engaging strips each have a vertical portion adjoining the base section, a head portion adjoining the vertical portion, and two end faces. The end faces of at least one fastener member are inclined with respect to the base section of that fastener member to facilitate sliding engagement of the fastener members.

The present invention further provides a fastener comprising first and second fastener members adapted for cooperative interengagement, the first fastener member including a base section and a plurality of parallel engaging strips projecting from and extending longitudinally of the base section. The engaging strips each have a vertical portion adjoining the base section, a head portion adjoining the vertical portion, and two end faces. The second fastener member includes a base section and a plurality of headed stems projecting from the base section. The head portions of the first fastener member have a plurality of transverse slots formed therein.

The present invention further provides a fastener comprising first and second fastener members adapted for cooperative interengagement, the first fastener member including a base section and a plurality of parallel engaging strips projecting from and extending longitudinally of the base section. The engaging strips each have a vertical portion adjoining the base section, a head portion adjoining the vertical portion, and two end faces. The second fastener member includes a base section and a plurality of headed stems projecting from the base section. The end faces of the first fastener member are inclined with respect to the base section, to facilitate sliding engagement of the fastener members.

DETAILED DESCRIPTION OF THE INVENTION

The present invention will be described in more detail based on the embodiments shown in the attached drawings.

Figure 1A:
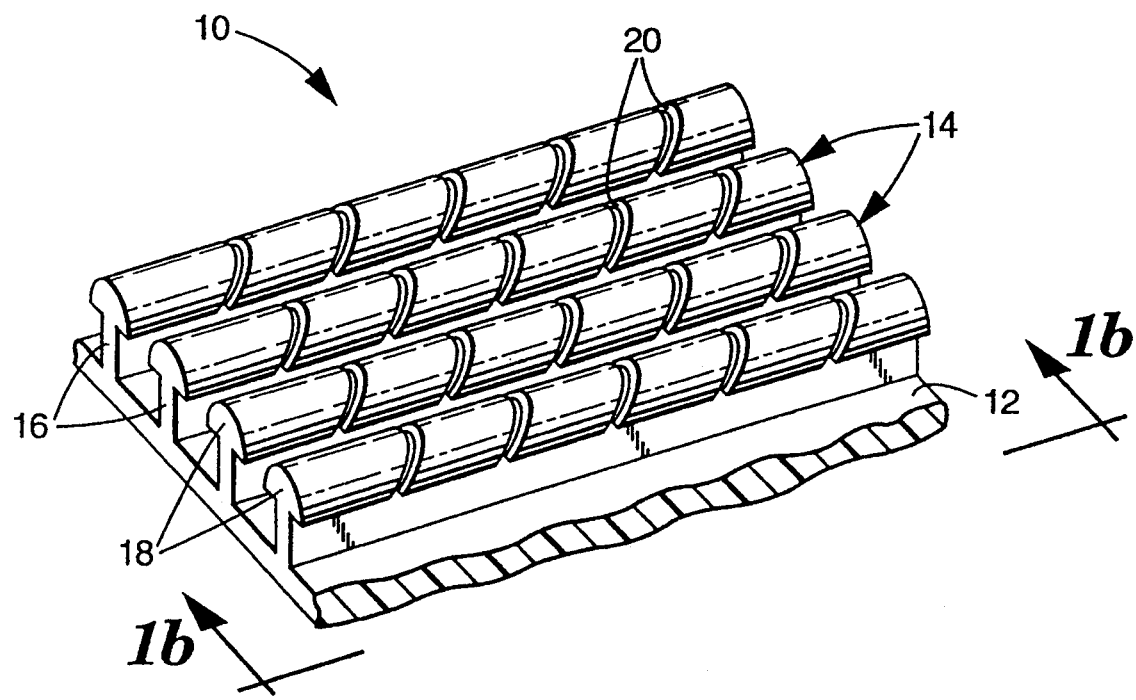
FIG. 1 is an illustration of a fastener member according to an embodiment of the present invention, wherein (a) is a perspective view; and (b) is a side view shown by an arrow I of (a)
Figure 1B:
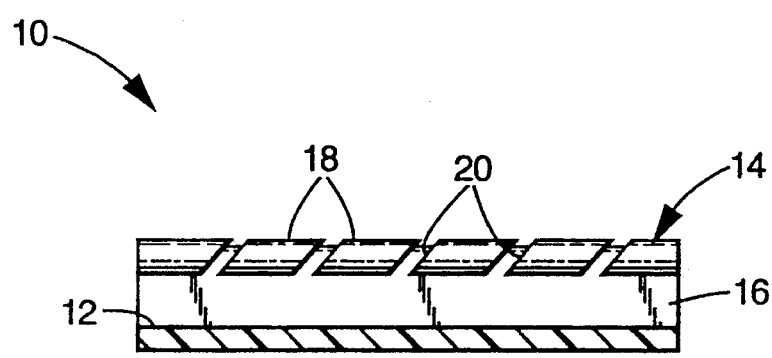
Figure 2A:
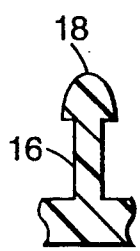
FIG. 2a is a partial sectional view of a first embodiment of an engaging strip of the fastener member of FIG. 1.
Figure 2B:
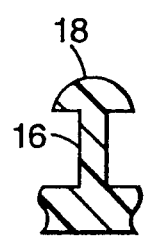
FIG. 2b is a partial sectional view of a second embodiment of an engaging strip of the fastener member of FIG. 1.
Figure 2C:
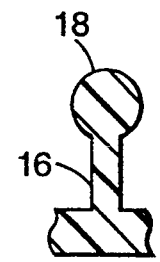
FIG. 2c is a partial sectional view of a third embodiment of an engaging strip of the fastener member of FIG. 1.
Figure 2D:
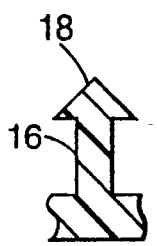
FIG. 2d is a partial sectional view of a fourth embodiment of an engaging strip of the fastener member of FIG. 1.
Figure 2E:
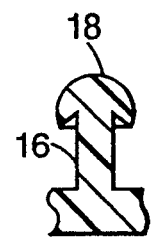
FIG. 2e is a partial sectional view of a fifth embodiment of an engaging strip of the fastener member of FIG. 1.

Referring to FIG. 1, a fastener member 10, according to one embodiment of the present invention, has a generally planar base section 12 and a plurality of engaging strips 14 projecting from one surface of the base section 12 and being adapted to be engaged with another fastener member. With suitable modifications, the fastener member of the present invention may comprise an arcuate or non-planar base section, although only a planar base section 12 is illustrated herein. The engaging strips 14 have substantially constant vertical sectional shapes and extend parallel to each other and longitudinally along the base section 12. Each engaging strip 14 includes a vertical portion 16 that adjoins the base section 12, and a head portion 18 that adjoins the vertical portion 16, preferably at the distal end of the vertical portion 16. The head portion 18 is wider than the vertical portion 16, such that an opposed head portion from an opposed fastener member may interengage between adjacent engaging strips 14 and be retained by the head portions thereof. The head portions 18 should be adapted for sliding engagement with opposed heads, and may be, for example, circular, semicircular, or triangular in cross-section, as shown in FIG. 2. The fastener member having the above construction is referred to herein as a "rail fastener member."

The fastener member 10 also includes a plurality of slots 20 which are formed on the head portions 18 of the engaging strips 14 and which extend transversely through the head portions 18. The slots 20 guide a plurality of opposed head portions of an opposed fastener member, and reduce the pressure necessary for interengagement so as to facilitate interengagement of the fastener members. The slots 20 are inclined with respect to the base section 12, as illustrated, but they may be vertical. The inclination angle of the slots 20 is preferably matched to the expected force angle α applied during interengagement of the opposed fastener members. The slots 20 can be formed by, for example, a machining process after the fastener member 10 is formed. The slots 20 are preferably formed in all engaging strips, and the width of each of the slots may be selected as desired.

The fastener member 10 has utility in a variety of applications. For example, an interengaging fastener can be constructed by using a pair of fastener members 10. In this case, when the engaging strips 14 of each fastener members are arranged opposite to each other while aligning the longitudinal direction thereof, and the predetermined pressure is applied to the each base section 12, the head portions 18 of the engaging strips 14 can be easily interengaged with each other due to the relatively high rigidity of the engaging strips 14, and thus the fastener members 10 may be interengaged.

Figure 7A:
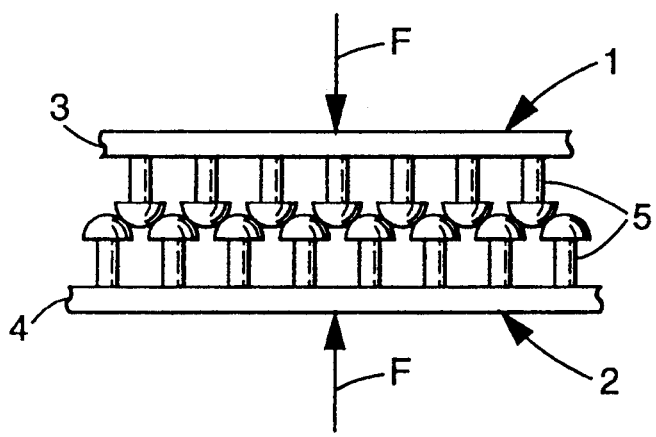
FIG. 7 is an illustration of a conventional interengaging fastener member, wherein (a) is a side view showing a normal engaging function, (b) is a side view showing
Figure 7B:
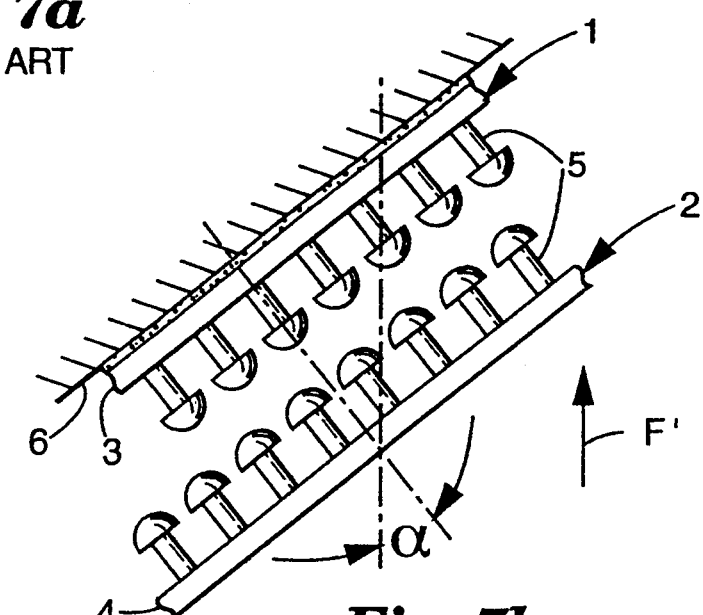
Figure 7C:
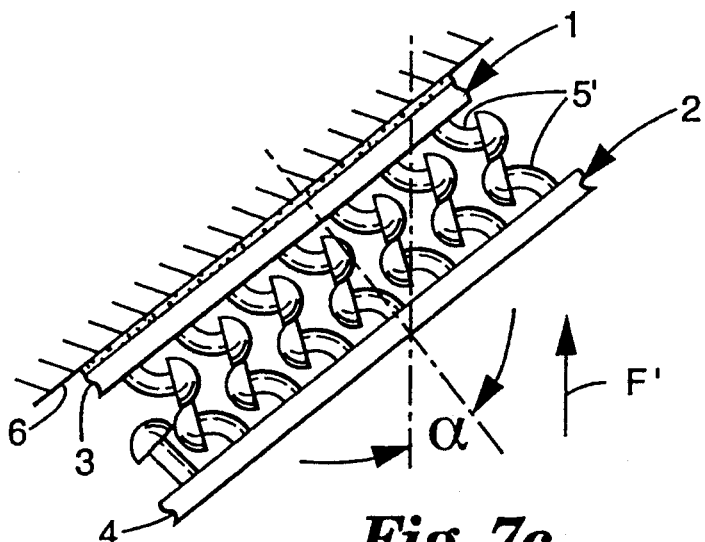

In another application, the fastener member 10 can be interengaged with a headed stem fastener member, as shown in FIG. 7. In this case, the vertical portions 16 and head portions 18 of the engaging strips 14 of the fastener member 10, and the headed stems of the headed stem fastener member should be sized and spaced so as to permit interengagement. The head portions 18 of the engaging strips 14 of the fastener member 10 interengage with the head portions of the headed stems under a predetermined compressive force, thus interengaging the fastener members. In this application, the slots formed in the head portions 18 guide the head portions of the headed stem fastener member, so that the compressive force required for the interengagement is reduced. Further, even when the compressive force is applied in the direction inclined to the base section 12 of the fastener member 10, the interengagement can he easily obtained without bending the headed stems of the headed stem fastener member by the guiding effect of the slots 20.

Figure 3A:
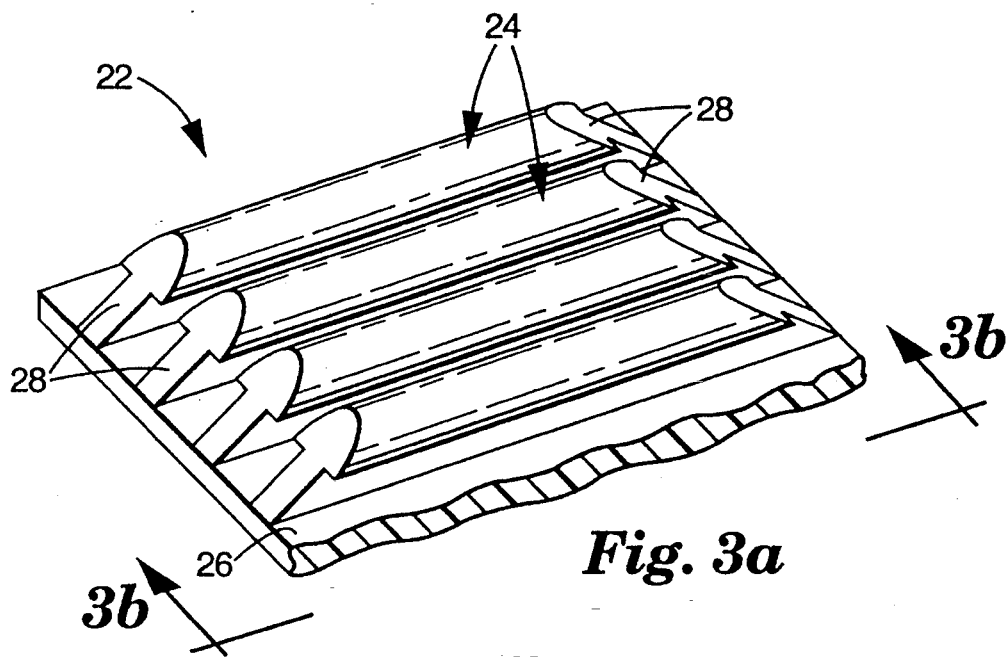
FIG. 3 is an illustration of a fastener member according to another embodiment of the present invention, wherein (a) is a perspective view, and (b) is a side view shown by an arrow III of (a)
Figure 3B:
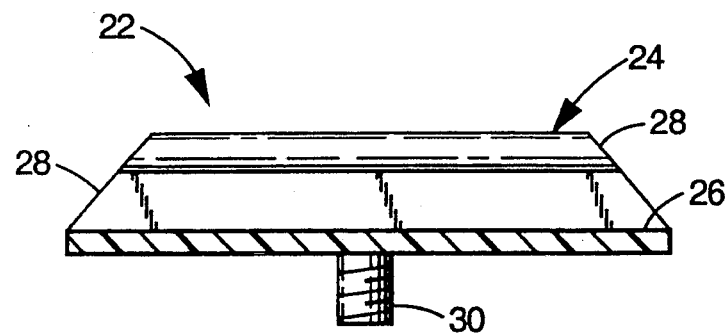

FIG. 3 shows a fastener member 22 according to the another embodiment of the present invention. The fastener member 22 is a rail fastener member similar to fastener member 10 shown in FIG. 1, and includes end faces 28 inclined at an acute angle in the projecting direction with respect to the base section 26 at each longitudinal end of a plurality of engaging strips 24, instead of the slots 20 formed in the engaging strips 14 of the fastener member 10. The end faces 28 can be formed by, for example, a machining process after the fastener member 22 is formed. The inclined end faces 28 facilitate sliding interengagement between the fastener member 22 and an opposed fastener member. It should be noted that the inclination angle may be anything other than 90° (measured relative to the base section), and the end faces may slant toward or away from the center of the fastener member.

The fastener member 22 has utility in a variety of applications. When using a pair of fastener members 22 for constituting an interengaging fastener, the two fastener members 22 can be slidably engaged with each other by inserting the engaging strips 24 of one fastener member 22 between the adjacent engaging strips 24 of the other fastener member 22, and inducing the sliding relative motion between the two fastener members 22. The inclined end faces 28 tend to ease the impact between the opposed engaging strips 22 and to facilitate the sliding interengagement. Also, when the fastener member 22 is interengaged with a headed stem fastener member, the impact between the engaging strips 22 and headed stems is reduced, thus facilitating the sliding interengagement. Of course, a fastener member including both the slots 20 and the inclined end faces 28 may be provided according to the present invention.

The fastener members 10 and 22 may be formed in one of several different ways. In the preferred embodiment, the fastener members 10 and 22 are integrally formed as extruded products of a polymeric material, such as polypropylene, nylon, polyester, or vinyl chloride.

The fastener members 10 and 22 may also have an attaching portion 30 on the back surface, which is the reverse side of the side on which engaging strips 14, 24 are provided of the fastener members 10, 22 to enable attachment thereof to a surface, as shown in FIG. 3. The attaching portion 30 may include screw threads. Alternately, a pressure sensitive adhesive layer could be applied to the back surface of the base section 12. In this case, a removable liner could be applied over the pressure sensitive adhesive layer to protect the adhesive prior to application.

Figure 4A:
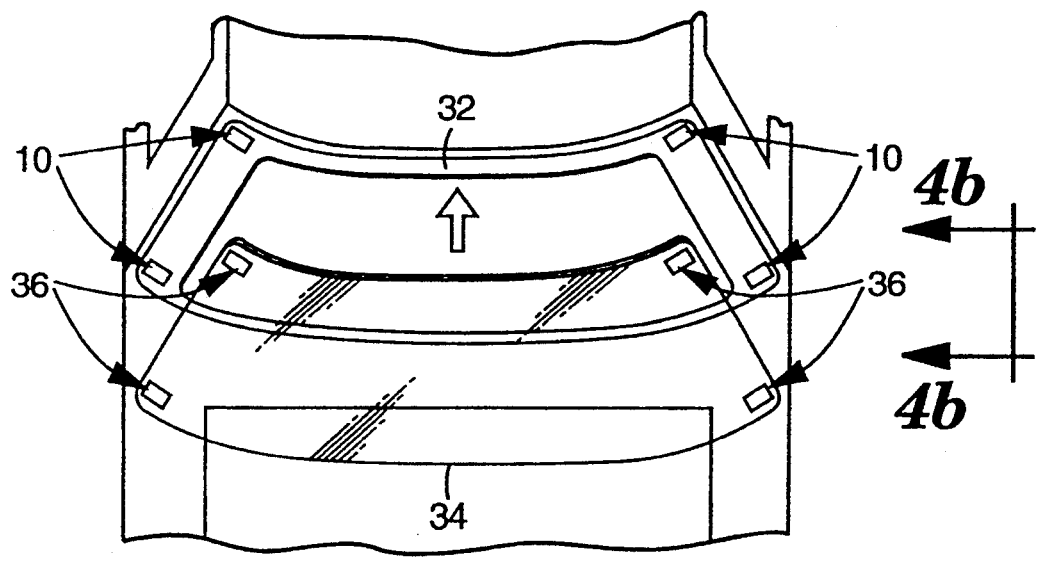
FIG. 4 is an illustration of one application of the fastener member in FIG. 1.
Figure 4B:
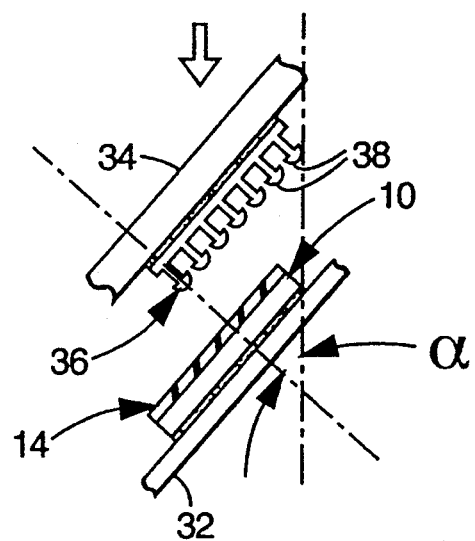

The interengaging fastener member according to the present invention is advantageously used for affixing a window to the window frame of a car. As shown in FIG. 4, a window 34 may be arranged on a window frame 32 of a Car body for permanent affixation to the window frame 32 by, for example, a urethane adhesive. The foregoing fastener member 10 can be used to assist in retaining the window 34 until the urethane adhesive has hardened. As illustrated in FIG. 4, when a curved portion of a rear window of a car must be fixedly retained by the fastener member 10, the direction (shown by an arrow) of pressure between the fastener member 10 and the opposed headed stem fastener member fixed on the window 34 is inclined by an angle e with respect to the projecting direction of the engaging strips 14 and the headed stems 38. In this case, the interengagement between the inventive fastener members 10 and 36 can be easily accomplished, as described above. Further, when the opposed fastener member is also a rail fastener member, the similar effect can be obtained.

Figure 5:
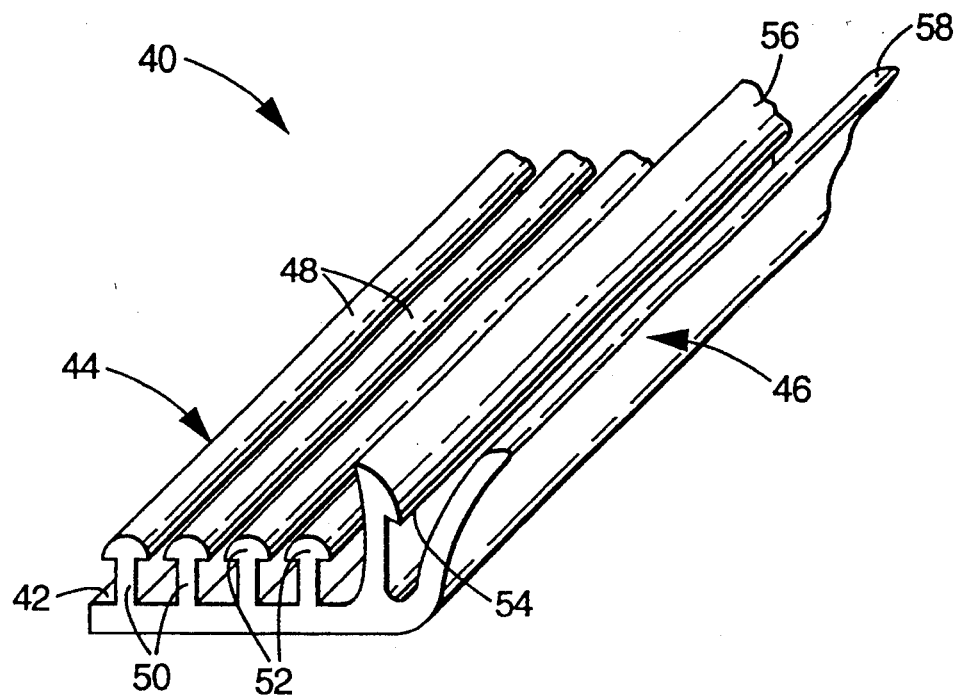
FIG. 5 is a perspective view of a fastener member for fixing a window according to the other embodiment of the present invention.

FIG. 5 shows a fastener member 40 for affixing a window to a window frame, according to the other embodiment of the present invention. The fastener member 40 has a generally planar base section 42, an engaging section 44, and a molding fastening section 46 integrally formed on the base section 42. The engaging projecting section 44 includes a plurality of engaging strips 48, which extend longitudinally with substantially constant vertical sectional shapes. Each engaging strip 48 includes a vertical portion 50 adjoining the base section 42, and a head portion 52 formed with a broadened cross section at the end of the vertical portion 50. The molding fastening section 46 includes an inner lip 56 which extends parallel to the engaging projecting section 44, a fastening portion 54 at the tip end thereof, and an outer lip 58 which is brought into contact with a car body panel at the tip end thereof. The fastener member 40 is integrally formed as an extrusion molded product from polymeric material.

Figure 6:
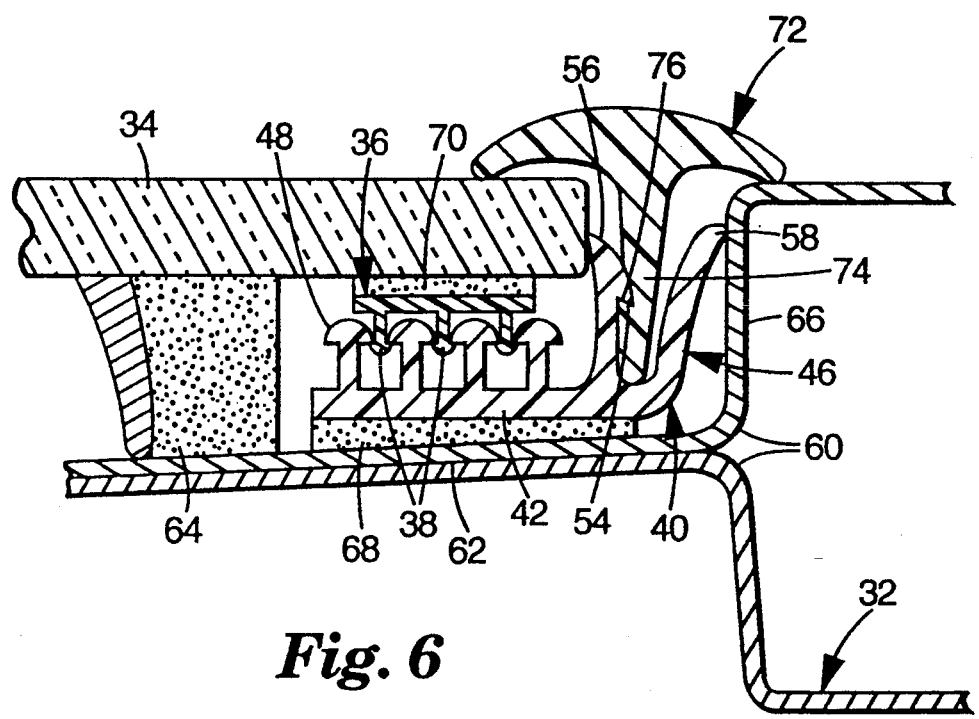
FIG. 6 is a sectional view of the fastener member in FIG. 5 shown with a window in a fixed condition in a window frame of a car body.

As shown in FIG. 6, the window frame 32 of a car is formed by joining outer and inner car body panels 60 to each other, and an urethane adhesive 64 is applied over the whole periphery of the inner surface of the window 34, which is opposed to the joint 62 of the car body panels 60. Further, the base section 42 of the fastener member 40 is attached by an adhesive 68 to the window frame between an upright wall portion 66 leading to the joint 62 and the location of the urethane adhesive 64. In this respect, the fastener member 40 is positioned on the window frame 32 so that the end of the outer lip 58 of the molding fastening section 46 is elastically brought into contact with the upright wall portion 66. Also, the fastener member 40 need not extend over the whole periphery of the window frame 32, but a number of the fastener members 40 may be provided at positions required for fixedly retaining the window 34, such as at the four corners of the window frame 32.

A headed stem fastener member 36 is attached on the periphery of the window 34 by an adhesive 70 at a position permitting interengagement with the fastener member 40 attached to the window frame 32. The headed stem fastener member 36 has a plurality of headed stems 38 that can be engaged with the engaging strips 48 of the fastener member 40. To affix the window 34 to the window frame 32, the window 34 is disposed on the window frame 32 with the urethane adhesive 64 interposed therebetween, and is precisely positioned while being moved slightly under such a condition that the headed stems 38 of the fastener member 36 are in contact with the engaging strips 48 of the fastener member 40. Then, a predetermined pressure is applied to the periphery of the window 34, so as to interengage the fastener member 36 with the fastener member 40. A window molding 72 is arranged at the entire periphery of the window 34 thus fixed to the window frame 32, for protection and decoration. A groove 76 extending in the longitudinal direction is formed at a leg portion 74 of the window molding 72. The fastening portion 54 of the inner lip 56 of the molding fastening section 46 of the fastener member 40 is brought into engagement with the groove 76, thereby the window molding 72 is fixed on the window frame 32.

The fastener member 40 can be integrally formed as an extrusion molded product of a polymeric material, as described above. Thus, the fastener member 40 can be manufactured relatively easily and inexpensively, which reduces the number of parts and processes, and contributes to efficiency and the reduction of cost. In another embodiment, a two-stage molding process could be used to mold the engaging projecting section 44 and the molding fastening section 46 from different materials. In this case, it is preferable to use a relatively highly elastic material, particularly for the outer lip 58 of the molding fastening section 46. Note, the fastener member 40 can also be injection molded, although this is generally more expensive than extrusion molding.

According to the foregoing fastener members 10 and 22, various new uses are given to conventional interengaging fasteners. For example, when a bumper must be attached to a car body, the fastener members 36 with headed stems 38 may be attached to the both curved ends of the bumper, and the fastener members 10 may be correspondingly attached to the car body with their engaging strips 14 being oriented horizontally. Then, the opposed fastener members 36 and 10 are interengaged with each other to retain the bumper. In this case, although a pressure is generally applied in an inclined direction with respect to the base section 12, interengaging between the opposed fastener members is obtained, and a strong retaining force can be obtained by interengagement between the headed stems 38 and the engaging strips 14. Moreover, the headed stems 38 can slide between adjacent engaging strips 14, so that it becomes possible to maintain a fixed state against thermal deformation of a resinous bumper, and to absorb an impact in a collision if the fastener members have sufficient structural strength.

Also, the foregoing fastener member 22 can be effectively used for the case where a fixing means that can be interengaged in a sliding manner is required because of limited space, such as in the case where a high-mount stop lamp is attached to a rear tray of a car interior. For example, when the fastener members 22 are attached to both the high-mount stop lamp and the rear tray to be used as a fixing means, the fixing position of the high-mount stop lamp can be freely chosen and moved, in such a range that the interengagement between the fastener members 22 can be obtained. Further, it becomes possible to interengage the fastener members 22 with each other without visually confirming them. Thus, when the fastener member 22 with inclined end faces 28 is used as an interengaging means at the position where the means are not easily confirmed visually, sliding interengagement without visual confirmation is easily carried out.

We claim:
1. An interengaging fastener member comprising a base section and a plurality of parallel engaging strips projecting from and extending longitudinally of said base section, said engaging strips each having a vertical portion adjoining said base section and a head portion adjoining said vertical portion and two end faces, said engaging strips adapted for engagement with a projecting head portion of an opposed fastener member, wherein said head portion of at least one of said engaging strips has a plurality of transverse slots formed therein wherein said slots are inclined with respect to said base section.

2. The interengaging fastener member of claim 1, further including attaching means on a surface of said base section opposite said engaging strips to enable attachment of the fastener member to an object.

3. An interengaging fastener member comprising a base section and a plurality of parallel engaging strips projecting from and extending longitudinally of said base section, said engaging strips each having a vertical portion adjoining said base section and a head portion adjoining said vertical portion and two end faces, said engaging strips adapted for engagement with a projecting head portion of an opposed fastener member, wherein said end faces are inclined with respect to said base section to facilitate sliding engagement of the fastener member with an opposed fastener member.

4. An interengaging fastener member of claim 3, further including attaching means on a surface of said base section opposite said engaging strips to enable attachment of the fastener member to an object.

5. A fastener comprising first and second fastener members adapted for cooperative interengagement, said fastener members each including a base section and a plurality of parallel engaging strips projecting from and extending longitudinally of said base section, said engaging strips each having a vertical portion adjoining said base section and a head portion adjoining said vertical portion and two end faces, wherein said end faces of at least one fastener member are inclined with respect to said base section of that fastener member to facilitate sliding engagement of the fastener members.

6. A fastener comprising first and second fastener members adapted for cooperative interengagement, said first fastener member including a base section and a plurality of parallel engaging strips projecting from and extending longitudinally of said base section, said engaging strips each having a vertical portion adjoining said base section and a head portion adjoining said vertical portion and two end faces, said second fastener member including a base section and a plurality of headed stems projecting from said base section, wherein said head portions of said first fastener member have a plurality of transverse slots formed therein wherein said slots are inclined with respect to said base section of said first fastener member.

7. A fastener comprising first and second fastener members adapted for cooperative interengagement, said first fastener member including a base section and a plurality of parallel engaging strips projecting from and extending longitudinally of said base section, said engaging strips each having a vertical portion adjoining said base section and a head portion adjoining said vertical portion and two end faces, said second fastener member including a base section and a plurality of headed stems projecting from said base section, wherein said end faces of the first fastener member are inclined with respect to said base section to facilitate sliding engagement of the fastener members.

* * * * *